United States Patent [19]

Marvin

[11] 4,188,115
[45] Feb. 12, 1980

[54] MAGNETIC FILM CARRIER

[75] Inventor: Roger L. Marvin, Wichita, Kans.

[73] Assignee: Kreonite, Inc., Wichita, Kans.

[21] Appl. No.: 919,754

[22] Filed: Jun. 28, 1978

[51] Int. Cl.$^2$ .............................................. G03B 27/62
[52] U.S. Cl. ...................................... 355/75; 352/129
[58] Field of Search ................... 355/75, 76; 352/129; 354/276; 248/206 R, 206 A; 269/8

[56] References Cited

U.S. PATENT DOCUMENTS

| | | | |
|---|---|---|---|
| 2,341,098 | 2/1944 | Hansen | 355/76 X |
| 2,591,519 | 4/1952 | Decker | 352/129 X |
| 3,642,370 | 2/1972 | Meredith et al. | 355/75 |

FOREIGN PATENT DOCUMENTS 1275353  8/1968  Fed. Rep. of Germany ............. 355/75

*Primary Examiner*—Richard A. Wintercorn
*Attorney, Agent, or Firm*—Edwin H. Crabtree

[57] ABSTRACT

A magnetic film carrier used in conjunction with a light source from a photographic printer. The carrier magnetically securing the film to the top of a printer lamphouse and allowing the film to be moved at various positions on the lamphouse for misaligned film or cropping during the printing of the film.

4 Claims, 4 Drawing Figures

MAGNETIC FILM CARRIER

BACKGROUND OF THE INVENTION

This invention relates generally to an apparatus for holding a film above a light source for printing thereof and more particularly but not by way of limitation to a magnetic film carrier for holding a film in place on top of a printer lamphouse.

Heretofore there have been various types of negative and positive film carriers for holding film above a light source. Also, vacuum pressure has been used for holding a negative in place during the film processing such as a negative mounting plate described in U.S. Pat. No. 3,588,079 to Addy.

In the past a magnetic film holder has been used for cameras and described in U.S. Pat. No. 2,604,831 to Fraenckel. None of the prior art film carriers have used the novel approach of magnetically attracting a film carrier to the top of a light source in a film carrier.

SUMMARY OF THE INVENTION

The subject invention uses magnetic attraction to hold a film in place above a light source used in the printing of the films.

The carrier is simple in design, easy to use and can be quickly attached to a light source used in the printing of the film.

The carrier may be rotated and offset at various positions on top of the light source when the picture on the film is misaligned or the cropping of the picture is desired.

The magnetic film carrier also provides a slide for moving the film adjacent the light source and above a viewing station prior to exposing the film above the light source.

The carrier includes a metal plate having an aperture through its center. A film holder is mounted on top of the plate and adapted for holding the film above the aperture in the plate. A magnet is mounted around the light source for magnetically attracting and holding the plate adjacent the light source.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
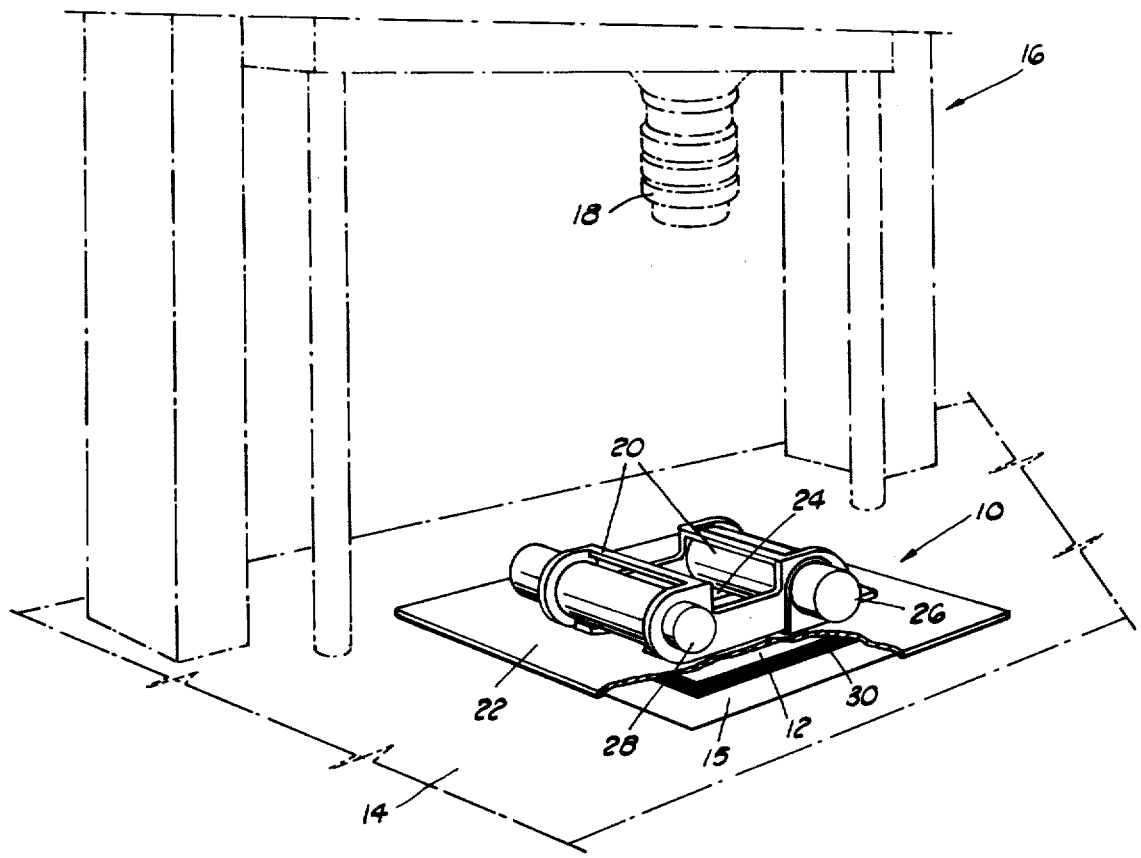
In FIG. 1 a perspective view of the magnetic film carrier is shown mounted on top of a lamphouse.

In FIG. 1 the magnetic film carrier is designated by general reference numeral 10. The carrier 10 is disposed on top of a light source 12 which is part of a lamphouse 14 shown in dotted lines. The light source 12 includes a frame 15 there around for centering the film to be printed thereon. The lamphouse 14 is part of a film printer 16 also shown in dotted lines and having a photographic lense 18. The lense 18 is disposed above the carrier 10 and light source 12.

The film carrier 10 includes a film holder 20 mounted on top of a metal plate 22. The metal plate 22 has an aperture 24 in the center thereof. The aperture 24 may be seen more clearly in FIGS. 2 and 3. The film holder 20 includes a pair of rollers 26 and 28, for guiding the film above the aperture 24 and exposing it to the light source 12. While the film holder 20 is shown, it should be appreciated that various types and designs of film holders could be used equally well for guiding the film past the aperture 24 in the plate 22.

Disposed around the light source 12 is a magnet 30 for magnetically attracting and holding the metal plate 22 on top of the light source 12 in the lamphouse 14. The magnet 30 may be of various types of permanent magnets or may be an electro-magnet 32 having electrical wiring 34 connected to a power source, for energizing the electro-magnet 32.

Figure 2:
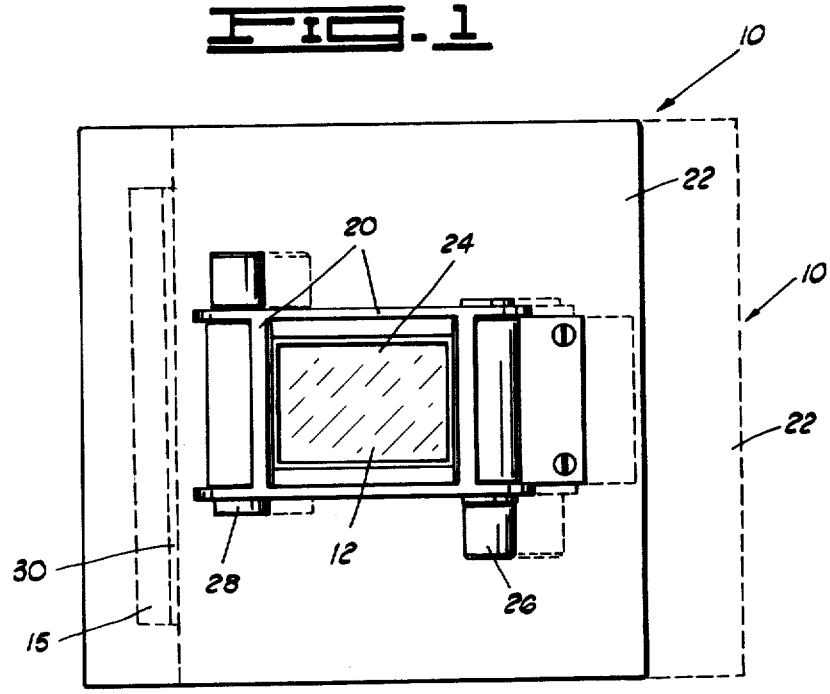
FIG. 2 is a top view of the carrier.

In FIG. 2 the metal plate 22 is shown centered over the frame 15 on top of the lamphouse 14. The aperature 24 is also centered above the light source 12. In operation the film would be mounted on the rollers 26 and 28 with the rollers guiding the film past the aperture 24, for exposing the film to the light source 12. The metal plate 22 is also shown in dotted lines offset from the center of the frame 15 and exposing a portion of the magnet 30.

Figure 3:
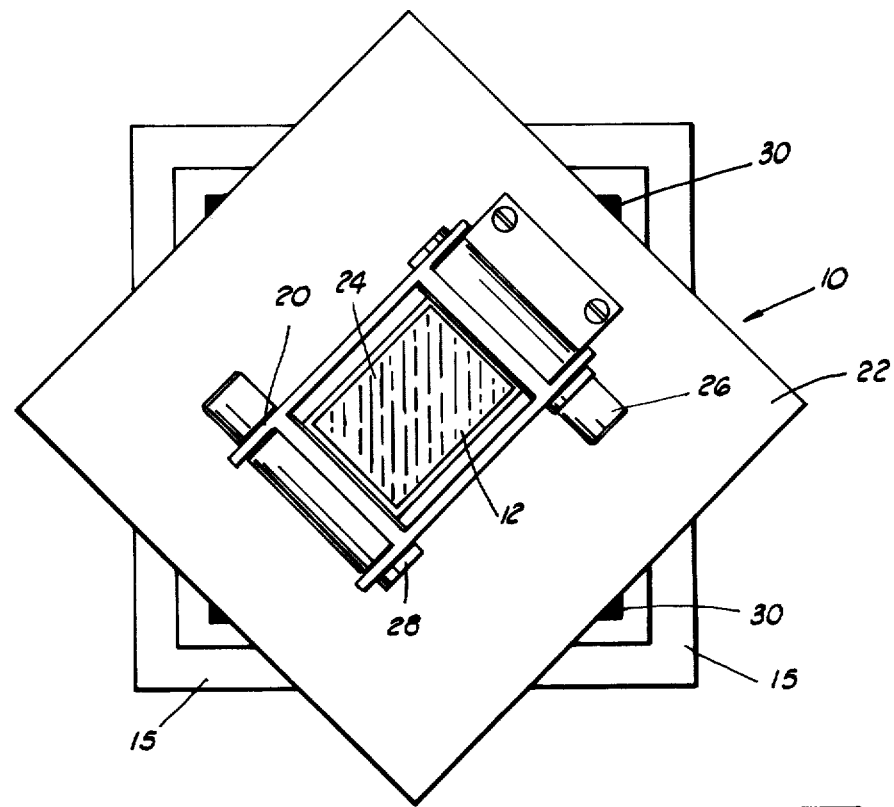
FIG. 3 is a top view of the carrier with the carrier turned at an angle on the light source.

In FIG. 3 the metal plate 22 is shown turned so that the film on the film holder 20 may be positioned at an angle should there be misalignment of the picture on the film, or if it is desired, to crop the picture when it is printed on the film printer 16. Through the use of the magnet 30, the metal plate 22 may be easily turned at various angles on the frame 15 with the magnet 30 retaining the plate 22 in a desired position. The light source 12 is shown in FIGS. 2 and 3 through the aperature 24 in the metal plate 22. The film holder 20 in FIGS. 1 through 4 is shown without any film so that the aperature 24 in the plate 22 and the light souce 12 can be seen.

Figure 4:
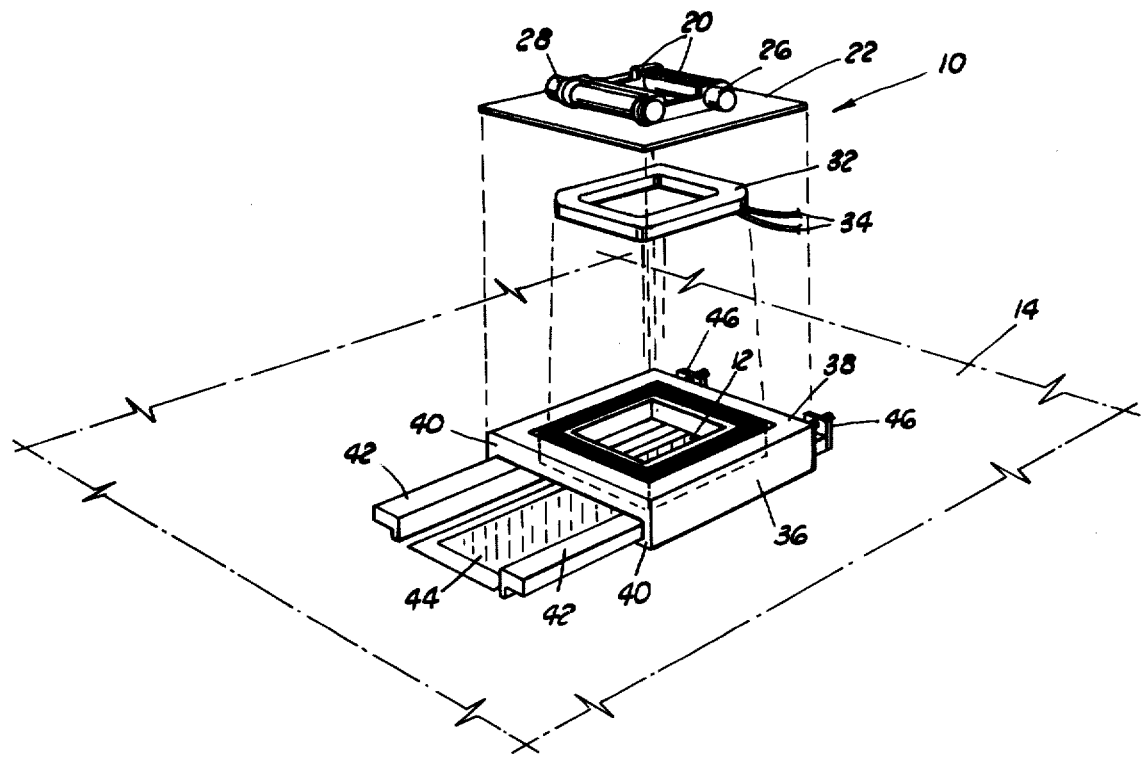
FIG. 4 is an alternate embodiment of the carrier mounted on a slide and a pair of guides disposed on opposite sides of the light source and a viewing station.

In FIG. 4 an alternate embodiment of the carrier 10 is illustrated wherein the carrier 10 includes a slide 36, having a slide frame 38 designed for receiving the electro-magnet 32 in the frame 38. While the electro-magnet 32 is illustrated, a permanent magnet 30 or any other type of magnet could be used equally well.

The slide 36 includes a pair of U-shaped arms 40 which slidably engage a pair of parallel, elongated guides 42. The guides 42 are mounted on top of the lamphouse 14 and are disposed on opposite sides of the light source 12 and a viewing station 44. The viewing station 44 is also on top of the lamphouse 14 and adjacent light source 12. By sliding the slide 36 to the right on the guides 42 as shown in FIG. 4, the metal plate 22 with the film holder 20 is centered above the light source 12. In this position the slide 36 rests against a pair of stops 46 mounted on the ends of the guides 42.

Prior to centering the carrier 10 above the light source 12, the carrier 10 may be moved to the left with the metal plate 22 and the film holder 20 centered above the viewing station 44. The viewing station 44 allows the operator of the printer 16 to view the film and center the film on the film carrier 10, prior to exposing the film above the light source 12. As mentioned above, the metal plate 22 can also be turned easily or offset on top of the magnet 30, should it be necessary to adjust for alignment of the picture on the film carrier 10. Also the magnet 30 may be of the type of magnets that are mechanically controlled as used on grinding machines. By turning a lever the magnetic attraction of the magnet 30 is released so that the metal plate 22 may be easily positioned on the lamphouse 14. By again turning the lever, the magnet 30 is activated and the metal plate 22 is securely held in place on the lamphouse 14.

Changes may be made in the construction and arrangement of the parts or elements of the embodiments as disclosed herein without departing from the spirit or scope of the invention defined in the following claims:

I claim:

1. A magnetic film carrier used in conjunction with a light source in a lamphouse of a photographic printer, the top of the lamphouse having a planar surface, the carrier comprising:
   a flat metal plate having an aperture through the center thereof;
   a film holder mounted on top of the plate and adapted for holding the film above the aperture in the plate; and
   magnetic means adapted for receipt in the lamphouse and around the light source and magnetically attracting and holding the flat metal plate on top of the planar surface of the lamphouse, the flat metal plate movable in a plane parallel to the plane of the top of the lamphouse so that angular adjustments can be made thereon for misalignment of photographs and cropping of photographs.

2. The carrier as described in claim 1, wherein the magnetic means is a permanent magnet disposed around the light source for holding the plate adjacent the light source.

3. The carrier as described in claim 1, wherein the magnetic means is an electro-magnet disposed around the light source for holding the plate adjacent the light source when the electro-magnet is energized.

4. A magnetic film carrier used in conjunction with a light source in a lamphouse of a photographic printer, the top of the lamphouse having a planar surface, the carrier comprising:
   a flat metal plate having an aperture through the center thereof;
   a film holder mounted on top of the plate and adapted for holding the film above the aperture in the plate;
   a pair of elongated guide rails disposed on opposite sides of the light source and attached to the top of the lamphouse;
   a slide slidably mounted on the guide rails, the slide having a slide frame with an aperture through the center thereof, the top of the slide frame having a planar surface; and
   a magnet mounted in the slide frame, the magnet magnetically attracting the plate for holding the plate on top of the slide frame and above the light source when the slide is moved to one end of the guide rails, the plate movable in a plane parallel to the plane of the slide frame so that angular adjustments can be made thereon for misaligned photographs and cropping of photographs.

* * * * *